(12) United States Patent
Isikdogan et al.

(10) Patent No.: US 11,880,763 B2
(45) Date of Patent: Jan. 23, 2024

(54) PARTIALLY-FROZEN NEURAL NETWORKS FOR EFFICIENT COMPUTER VISION SYSTEMS

(71) Applicant: Intel Corporation, Santa Clara, CA (US)

(72) Inventors: Furkan Isikdogan, San Jose, CA (US); Bhavin V. Nayak, San Jose, CA (US); Joao Peralta Moreira, Mountain View, CA (US); Chyuan-Tyng Wu, San Jose, CA (US); Gilad Michael, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 533 days.

(21) Appl. No.: 16/886,103

(22) Filed: May 28, 2020

(65) Prior Publication Data

US 2020/0293870 A1    Sep. 17, 2020

Related U.S. Application Data

(60) Provisional application No. 62/897,050, filed on Sep. 6, 2019.

(51) Int. Cl.
*G06N 3/08* (2023.01)
*G06V 10/70* (2022.01)
*G06V 10/764* (2022.01)
*G06N 3/063* (2023.01)
*G06F 18/214* (2023.01)
(Continued)

(52) U.S. Cl.
CPC ............ *G06N 3/08* (2013.01); *G06F 18/214* (2023.01); *G06N 3/048* (2023.01); *G06N 3/063* (2013.01); *G06V 10/70* (2022.01); *G06V 10/764* (2022.01); *G06V 10/774* (2022.01); *G06V 10/776* (2022.01); *G06V 10/82* (2022.01)

(58) Field of Classification Search
None
See application file for complete search history.

(56) References Cited

U.S. PATENT DOCUMENTS

2017/0256254 A1   9/2017  Huang et al.
2017/0351905 A1  12/2017  Wang et al.
(Continued)

OTHER PUBLICATIONS

Houlsby et al. "Parameter-Efficient Transfer Learning for NLP," Proceedings of the 36th International Conference on Machine Learning, Long Beach, CA, Jun. 13, 2019, 13 pages.
Ma et al. "ShuffleNet V2: Practical Guidelines for Efficient CNN Architecture Design," Jul. 30, 2018, pp. 1-19.
Whatmought et al. "FixyNN: Efficient Hardware for Mobile Computer Vision via Transfer Learning," Proceedings of the 2nd SysML Conference, Palo Alto, CA, Feb. 27, 2019, 13 pages.
(Continued)

*Primary Examiner* — Delomia L Gilliard
(74) *Attorney, Agent, or Firm* — HANLEY, FLIGHT & ZIMMERMAN, LLC

(57) ABSTRACT

An apparatus to facilitate partially-frozen neural networks for efficient computer vision systems is disclosed. The apparatus includes a frozen core to store fixed weights of a machine learning model, one or more trainable cores coupled to the frozen core, the one or more trainable cores comprising multipliers for trainable weights of the machine learning model, and wherein the alpha blending layer includes a trainable alpha blending parameter, and wherein the trainable alpha blending parameter is a function of a trainable parameter, a sigmoid function, and outputs of frozen and trainable blocks in a preceding layer of the machine learning model.

15 Claims, 12 Drawing Sheets

(51) Int. Cl.
  *G06N 3/048*    (2023.01)
  *G06V 10/774*   (2022.01)
  *G06V 10/776*   (2022.01)
  *G06V 10/82*    (2022.01)

(56) References Cited

U.S. PATENT DOCUMENTS

| | | | |
|---|---|---|---|
| 2020/0082269 A1* | 3/2020 | Gao | G06F 7/483 |
| 2020/0272899 A1* | 8/2020 | Dunne | G06N 3/08 |
| 2020/0293870 A1* | 9/2020 | Isikdogan | G06F 18/214 |
| 2020/0302240 A1 | 9/2020 | Murata et al. | |
| 2022/0050918 A1* | 2/2022 | Macedo | G06N 20/00 |
| 2022/0391680 A1 | 12/2022 | Isikdogan et al. | |
| 2022/0400373 A1 | 12/2022 | Zhu et al. | |

OTHER PUBLICATIONS

United States Patent and Trademark Office, "Final Office Action," issued in connection with U.S. Appl. No. 17/887,359, dated Jun. 9, 2023, 11 pages.

Mazouz et al., "Adaptive Hardware Reconfiguration for Performance Tradeoffs in CNNs," IEEE, 2019 NASA/ESA Conference on Adaptive Hardware and Systems (AHS), Jul. 2019, 8 pages.

United States Patent and Trademark Office, "Non-Final Rejection," issued in connection with U.S. Appl. No. 17/887,359, dated Dec. 22, 2022, 9 pages.

United States Patent and Trademark Office, "Notice of Allowance and Fee(s) Due," issued in connection with U.S. Appl. No. 17/887,359, dated Aug. 23, 2023, 8 pages.

\* cited by examiner

600

| Input Size | Type | Frozen Core | | Trainable Core | |
|---|---|---|---|---|---|
| | | stride | repeat | stride | repeat |
| 640×480×3 | Conv2D | 2 | 1 | 2 | 1 |
| 320×240×32 | Semifreddo | 2 | 1 | 2 | 1 |
| | | 1 | 3 | - | - |
| 160×120×64 | Semifreddo | 2 | 1 | 2 | 1 |
| | | 1 | 3 | - | - |
| 80×60×128 | Semifreddo | 1 | 1 | 1 | 1 |
| | | 1 | 3 | - | - |
| 80×60×128 | Semifreddo | 2 | 1 | 2 | 1 |
| | | 1 | 3 | - | - |
| 40×30×256 | Model Head | 1 | 1 | 1 | 1 |

FIG. 6

|  |  |  |  | Image Classification | | Semantic Segmentation | | Face Classification |
|---|---|---|---|---|---|---|---|---|
| Model | Configuration | Number of Parameters | Silicon Area | Top-1 Accuracy | Top-5 Accuracy | Pixelwise Accuracy | Mean IoU | Top-1 Accuracy |
| SemifreddoNets | Two trainable cores | 260K | 2 mm² | 0.69 | 0.89 | 0.80 | 0.40 | 0.87 |
| | Two cores w/o core shuf. | 260K | 2 mm² | 0.66 | 0.87 | 0.79 | 0.39 | 0.86 |
| | One trainable core | 200K | 1.33 mm² | 0.65 | 0.87 | 0.78 | 0.39 | 0.86 |
| | Frozen core only | 140K | 0.66 mm² | 0.63 | 0.85 | 0.77 | 0.36 | 0.58 |
| | Trainable cores only | 120K | 1.34 mm² | 0.61 | 0.83 | 0.75 | 0.36 | 0.84 |
| ShuffleNet V2 | 0.5× | 65K | 0.78 mm² | 0.60 | 0.82 | 0.79 | 0.36 | 0.81 |
| | 1.0 | 240K | 2.62 mm² | 0.69 | 0.88 | 0.80 | 0.38 | 0.92 |

FIG. 8B

PARTIALLY-FROZEN NEURAL NETWORKS FOR EFFICIENT COMPUTER VISION SYSTEMS

CROSS-REFERENCE

The present application is related to and, under 35 U.S.C. 119(e), claims the benefit of and priority to U.S. Provisional Application 62/897,050, entitled METHODS AND APPARATUS TO PARTIALLY FREEZE NEURAL NETWORKS, filed Sep. 6, 2019, the contents of which are incorporated herein by reference.

FIELD

Embodiments relate generally to data processing and more particularly to partially-frozen neural networks for efficient computer vision systems.

BACKGROUND OF THE DESCRIPTION

In recent years, on-device artificial intelligence applications have become increasingly common for a wide variety of products, including smartphones, autonomous vehicles, drones, and different types of robots. Many, if not most, of those "visually intelligent" devices today are powered by convolutional neural networks (CNNs) that run either on cloud computing platforms or the device itself.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawing(s) and accompanying written description to refer to the same or like parts.

FIG. 6 is a table describing an example implementation of a machine learning model with partially frozen blocks.

FIG. 8B is a table describing example performance statistics of an example machine learning model and an example machine learning model with partially frozen weights.

DETAILED DESCRIPTION

Figure 1:
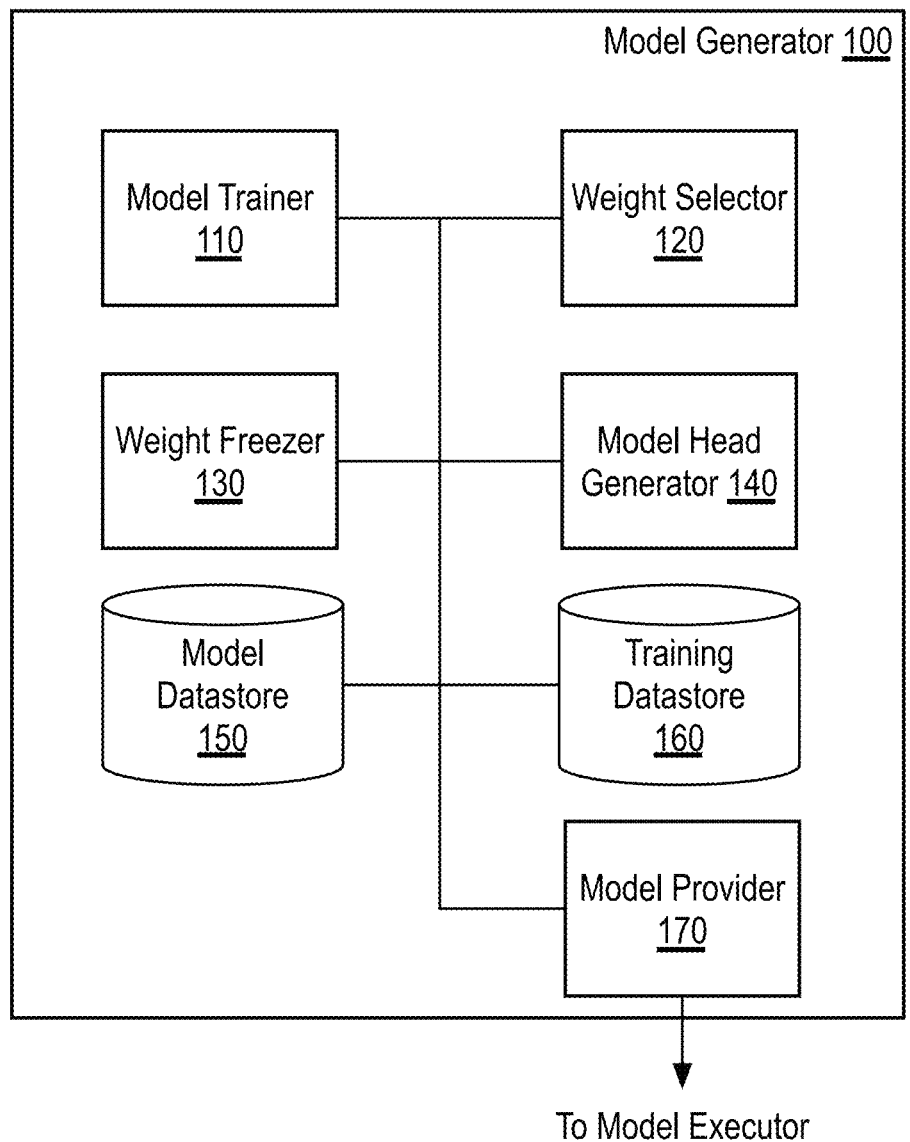
FIG. 1 is a block diagram of an example model generator to train and partially freeze a machine learning model.

Implementations of the disclosure describe partially-frozen neural networks for efficient computer vision systems. Cloud-based artificial intelligence (AI) services rely on an Internet connection to operate and transmit data back and forth between the device and the remote servers, which can, in some cases, result in high latency. As a result of this delay, such cloud-based AI services are typically not suitable for real-time applications. On-device AI systems, on the other hand, do not rely on remote resources, and therefore run with much less latency. Furthermore, on-device computing usually provides a higher level of security than cloud-based applications because the user data does not leave the device. However, running an AI system on a low power device remains a challenging task, since many AI systems (e.g., computer vision systems) require a substantial amount of computing power to run in real-time. Therefore, on-device solutions may utilize expensive and large accelerators to achieve low latency and high throughput.

Many computer vision applications use a trained neural network architecture to accomplish a particular task. One way to reduce the complexity of a neural network inference hardware is to fix the topology of a given network and implement it as a fixed-function style, in-line hardware block. Until recently, fixing the topology was not a feasible approach given the pace of development in network architecture design. The complexity of the top-performing models also made them difficult to implement in fully-pipelined hardware. As the network topologies have matured and more efficient neural network design patterns emerged, hard-wiring at least a portion of a neural network topology has become a somewhat less flexible but more efficient alternative to performing all of the computation on general-purpose convolutional neural network (CNN) accelerators.

Using a fixed-topology model relies on the idea that a model that works well for one task is likely to generalize for other similar types of problems. Although searching for a custom network architecture for each task is shown to have some value, the efficiency benefits of using a fixed-topology model overweigh the marginal value of application-specific topologies. Examples disclosed herein significantly reduce the hardware complexity of a machine learning model by using a fixed-topology neural network and partially frozen weights. The frozen part is fixed in hardware and is designed to be generalized across different tasks and input data types. The trainable part includes configurable weights across varying levels of the model, leaving room for adapting to new tasks and new kinds of data.

Examples disclosed herein work on low power environments to bring significant AI capabilities to almost any consumer device.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a convolutional neural network is used. Using a convolutional neural network enables classification of objects in images, natural language processing, etc. In general, machine learning models/architectures that are suitable to use in the example approaches disclosed herein will be convolutional neural networks. However, other types of machine learning models could additionally or alternatively be used such as recurrent neural network, feedforward neural network, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an acceptable amount of error is achieved. In examples disclosed herein, training is performed locally. Training is performed using hyperparameters that control how the learning is performed (e.g., a learning rate, a number of layers to be used in the machine learning model, etc.). In examples disclosed herein, hyperparameters control the method of selecting weights to freeze, the amount of weights to freeze, etc. Such hyperparameters are selected by, for example, manual selection. In some examples re-training may be performed. Such re-training may be performed in response to freezing weights in the model.

Once training is complete and weights in the model are partially frozen, which are configurable across varying levels of the trained model, the model is deployed for use as a hardware construct that processes an input and provides an output based on the network of nodes and connections defined in the model. The model can be stored at an example model generator. The model may then be executed by an example model executor. In some examples, the model may be deployed to low power hardware systems for execution.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Implementing a deep CNN in fully pipelined hardware provides numerous benefits over using general-purpose accelerators. In some examples, fixed-function-style neural network hardware can reach a utilization rate of 100%, as compared to 40% typical utilization rate in generic CNN accelerators. However, building such hardware can be challenging due to the sheer number of parameters (i.e., weights, activations, etc.) that many modern CNNs have. Those parameters incur significant silicon area when the parameters are stored in dedicated memory, such as registers or SRAM. In some examples, time multiplexing of hardware accelerators could help reduce the memory requirement. However, this would also decrease the overall efficiency of the system. A highly efficient, fully pipelined neural network hardware utilizes all weights kept in memory simultaneously. The high cost associated with the weights makes a fully trainable model not feasible for small area budgets.

Some conventional approaches have tried to address the high cost problem noted above by using a fixed feature extractor that freezes the parameters (e.g., weights) of the first N layers of a given model and performing the remaining computations on a generic deep learning accelerator. Although freezing the first layers increases hardware efficiency, it does not provide for any sort of significant domain adaptation in the model. For example, if the frozen parameters are pre-trained on RGB images, a fixed feature extractor is not able to fully utilize different types of inputs, such as depth maps or feature maps extracted by other networks. Furthermore, using a fully-programmable head would decrease the overall efficiency of the system, particular under low silicon area budgets, where the programmable head would bottleneck the fixed feature extractor.

Examples disclosed herein address the high cost problem noted above by vertically freezing a portion of the weights (and/or other parameters), distributed across the layers in the model. In some examples, the frozen weights are fixed scalars with a single input to substitute the corresponding multipliers. The portion of the weights frozen may be uniform across the layers or may be changing gradually across the layers. Furthermore, examples disclosed herein provide for repeatable fully-pipelined hardware blocks that implement the vertical partially frozen weights across the layers.

Implementations of the disclosure not only reduces (e.g., saves) the memory that would store the parameters but also reduces the complexity of the logic design by replacing the multipliers with cheaper scalars and, in some examples, pruning zero weights. In further examples, the remaining, non-frozen weights are stored in registers or SRAM and left as configurable to retain an ample amount of flexibility in the model. Lastly, the repeatable nature of the blocks provides the flexibility to adjust model complexity without implementing a hardware change.

FIG. 1 is a block diagram of an example model generator to train and partially freeze a machine learning model. The example model generator 100 of FIG. 1 includes a model trainer 110, a weight selector 120, a weight freezer 130, a model head generator 140, a model datastore 150, a training datastore 160, and a model provider 170.

The example model trainer 110 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc.

The example model trainer 110 trains the machine learning model. In some implementations, the machine learning model can be implemented with a neural network architecture that provides a backbone network that feeds feature maps to application-specific model heads. In one example, the backbone network of the model may take an image as input and extract the feature map upon which the application-specific model head(s) can make a prediction. In implementations of the disclosure, the backbone network of the model can consist of a plurality of model cores. In examples disclosed herein, the model trainer 110 trains each of the model cores with the same training and validation data. However, other approaches to training the model can additionally and/or alternatively be used. For example, the model trainer 110 can select a subset of the model cores (e.g., one core, two cores, etc.) and train the selected subset. In some examples, the model trainer 110 determines whether the model should be retrained if the number of weights that have been frozen exceeds a retrain limit threshold. In other examples, a user indicates to the model trainer 110 that the model should be retrained.

The example weight selector 120 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example weight selector 120 selects weights in the machine learning model to freeze. In examples disclosed herein, the weight selector 120 selects a random set of weights in each layer until a ratio of frozen to non-frozen weights is met. However, any other methods to select weights to freeze can additionally and/or alternatively be used.

The example weight freezer 130 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In examples disclosed herein, the weight freezer 130 freezes weights by setting the value of the weight to a fixed scalar, e.g., a predefined value. However, any other methods to freeze a weight can additionally and/or alternatively be used.

The example model head generator 140 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example model head generator 140 attaches a model head to the trained model. As discussed above, the model head can receive an extracted feature map (e.g., from a backbone network of the model) and produces output vectors for a given task. In some implementations, the model head is used to perform computer vision tasks. For example, the model head may utilize the extracted feature map to make a prediction for purposes of image classification, scene classification, coordinate identification, and so on. In some examples, the model head includes a single 1×1 convolution layer. In other examples, the model head includes a configurable activation operator (e.g., a rectifier). In further examples, the model head includes a global average pooling operator.

The example model datastore 150 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example model datastore 150 may be in any data format such as, for example, binary data, comma delimited data, tab delimited data, structured query language (SQL) structures, etc. While, in the illustrated example, the example model datastore 150 is illustrated as a single device, the example model datastore 150 and/or any other data storage devices described herein may be implemented by any number and/or type(s) of memories. In the illustrated example of FIG. 1, the example model datastore 150 stores the model generated and trained by the example model trainer 110. In some examples, the model datastore 150 may store information regarding the procedure for freezing weights, such as the method to select weights, the weights selected to be frozen by the weight selector 120, values of the weights to freeze, etc.

The example training datastore 160 of the illustrated example of FIG. 1 is implemented by any memory, storage device and/or storage disk for storing data such as, for example, flash memory, magnetic media, optical media, solid state memory, hard drive(s), thumb drive(s), etc. Furthermore, the data stored in the example training datastore 160 may be in any data format such as, for example, binary data, comma delimited data, tab delimited data, SQL structures, etc. While, in the illustrated example, the example training datastore 160 is illustrated as a single device, the example training datastore 160 and/or any other data storage devices described herein may be implemented by any number and/or type(s) of memories. In the illustrated example of FIG. 1, the example training datastore 160 stores the training data to be used by the example model trainer 110 to train a model.

The example model provider 170 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.

The example model provider 170 provides the model to a model executor. In examples disclosed herein, the model provider 170 provides the model to an external system to convert the model into a hardware format. In other examples, the model provider 170 provides the model over a network such as the Internet.

As noted above, in implementations of the disclosure, the model generator 100 can vertically freeze a portion of the weights (and/or other parameters), distributed across the layers in the model. In some examples, the frozen weights are fixed scalars with a single input to substitute the corresponding multipliers. The portion of the weights frozen may be uniform across the layers or may be changing gradually across the layers. Determining the portions of the weights of the model to freeze is a design choice that can impact the behavior and capabilities of the model. In some examples, a first number of layers of a neural network are frozen as a form of transfer learning. This type of parameter freezing is usually done to speed up training and to reduce the risk of overfitting. In other examples, it is possible to train the first layers while keeping the rest of the network frozen to adapt an already trained model to different input data. Freezing the first layers would work well on similar input data, whereas freezing the last layers would generalize well for similar tasks. FIGS. 2 through 7 discussed below provide further description of vertical partially frozen parameters across layers of a machine learning model.

Figure 2:
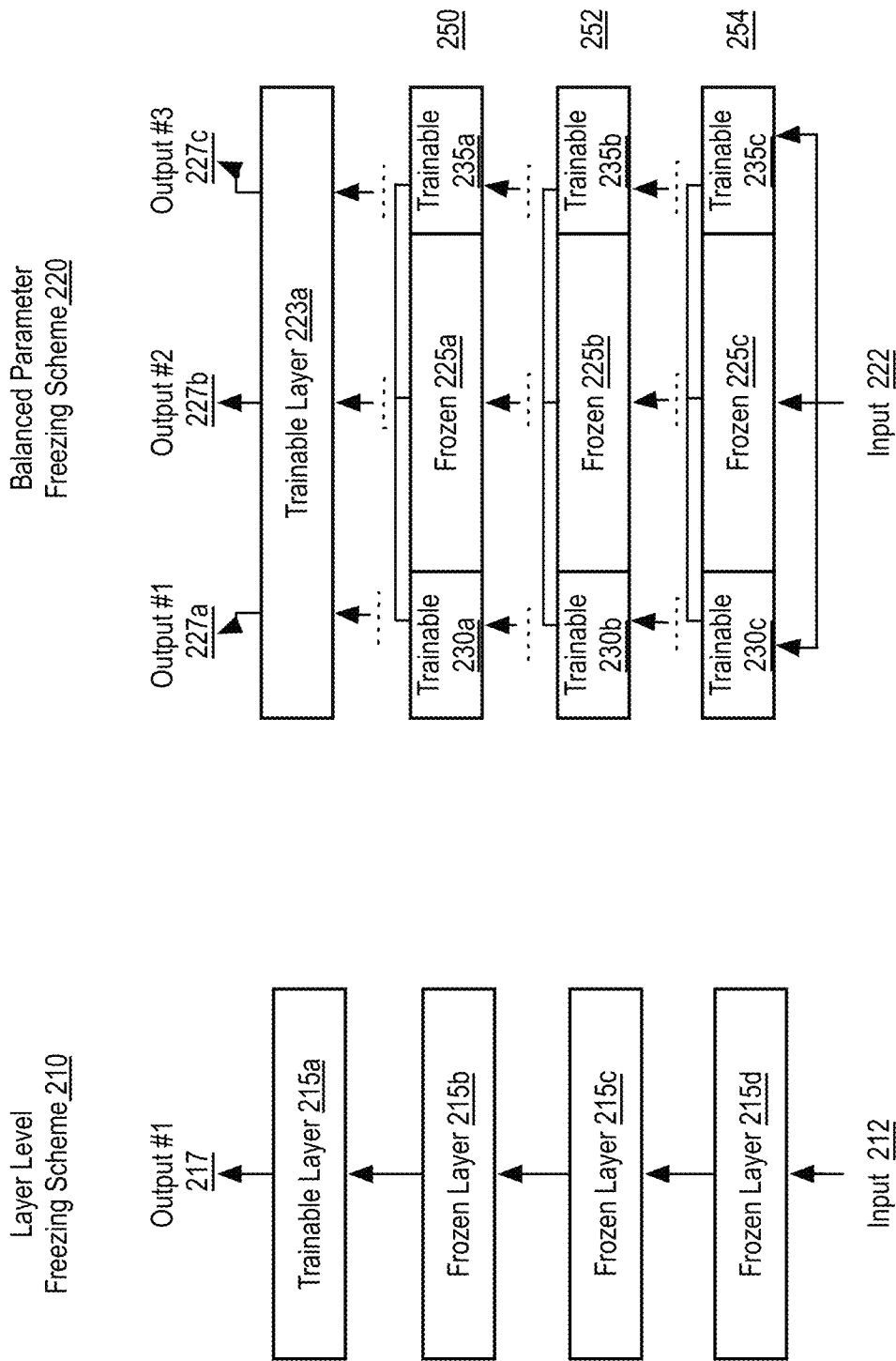
FIG. 2 is a diagram illustrating example machine learning models with frozen parameters or weights.

FIG. 2 is a diagram illustrating example machine learning models with frozen parameters, such as weights. FIG. 2 depicts a balanced parameter freezing scheme 220 that has the flexibility to both adjust to different types of input data and tasks. Some blocks include frozen weights, e.g., fixed weights, whereas the other blocks include parts having trainable weights, e.g., configurable weights. In one implementation, frozen weights refer to fixed values utilized as weight parameters in the machine learning model, where the fixed values remain the same between different layers of the machine learning model. In one implementation, trainable weights refer to configurable values utilized as weight parameters in the machine learning model, where the configurable values may change between different layers of the machine learning model. The balanced parameter freezing scheme 220 of implementations of the disclosure vertically freezes a portion of the weights 225a, 225b, 225c distributed across the layers 250, 252, 254. This is in contrast to a layer-level horizontal freezing approach 210 that operates on input 212 with weights that are frozen entirely across a first N set of frozen layers 215b, 215c, 215d and then allows configurable weights for a remaining set of trainable layers 215a, resulting in a single output 217.

The balanced parameter freezing scheme 220 vertically freezes a portion of the weights, referred to as frozen weights 225a, 225b, 225c, in a distributed manner across the layers 223a, 250, 252, 254. One or more of the layers 250, 252, 254 may include trainable portions having trainable weights 230a, 230b, 230c, 235a, 235b, 235c and frozen portions having frozen weights 225a, 225b, 225c. The proportion of frozen weights 225a, 225b, 225c can be uniform across the layers as well as changing gradually. In some examples, a freezing scheme may fix a certain percentage of all weights in each layer. In some examples, the silicon area budget may be used to determine the freezing rate. In such an example, this may result in a slice of trainable variables in the model.

Some examples include multiple trainable slices that share the same frozen parts. Referring to FIG. 2, one trainable slice may include trainable portions having trainable weights 230a, 230b, 230c of layers 250, 252, 254, while a second trainable slice may include trainable portions having trainable weights 235a, 235b, 235c of layers 250, 252, 254. The trainable slices can either be used to perform different tasks on the same input 222 resulting in different outputs 227a, 227b, 227c, or the trainable slices an act as one large network to perform one task with higher accuracy.

Figure 3:
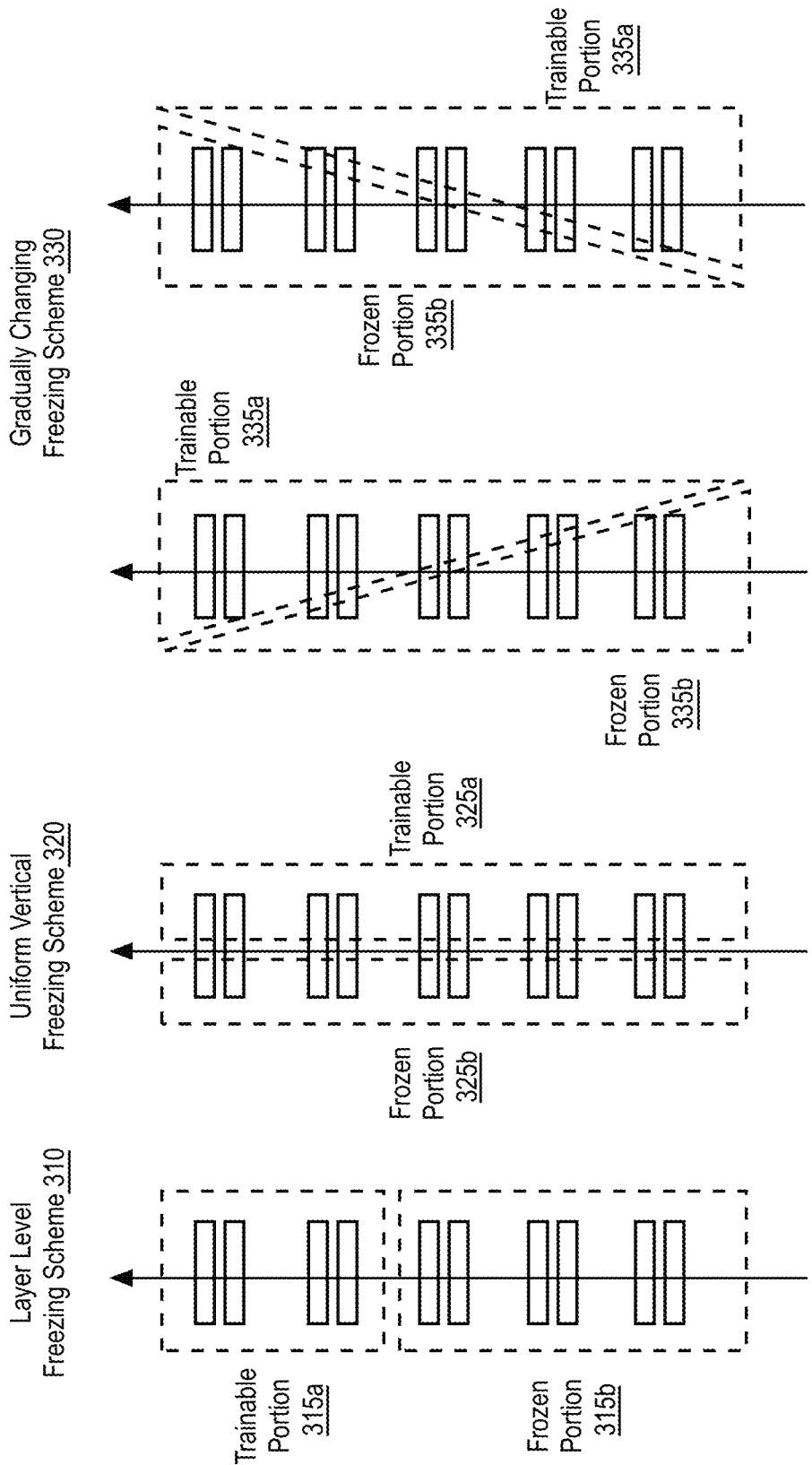
FIG. 3 is a diagram illustrating example strategies for freezing layers and/or weights in a machine learning model.

FIG. 3 is a diagram illustrating example strategies for freezing layers and/or weights in a machine learning model. FIG. 3 illustrates how vertical weight freezing schemes 320, 330 may differ from a conventional layer-level freezing approach 310. Layer-level freezing approach 310 may have a trainable portion 315a and frozen portion 315b, wherein the weights of the layers in frozen portion 315b are frozen while the weights of the layers in trainable portions 315a are trainable. In layer-level freezing approach 310 the first N layers are frozen and the remaining layers are trainable.

Vertical weight freezing schemes 320, 330 have the flexibility to adjust to different types of input data and tasks. Many different types of vertical weight freezing schemes 320, 330 can be tailored to different kinds of use cases. Uniform vertical freezing scheme 320 may include trainable portion 325a and frozen portions 325b, where the proportion of frozen weights in frozen portion 325b is uniform across the layers of the model. Gradually-changing freezing schemes 330 may also include trainable portion 335a and frozen portions 335b, where the proportion of frozen weights in frozen portion 335b gradually changes across the layers of the model. Different illustrations of gradual change of frozen weight portions are depicted in the two versions of a model shown in FIG. 3.

For example, if the system is expected to perform various tasks while the input remains the same, then the freezing ratio can be decreased gradually from the input layer to the output layer. Similarly, if the system is expected to perform similar tasks, but the input data source may vary, then the freezing ratio can be increased gradually. Other depictions of gradual change of frozen weights are also possible. In examples disclosed herein, the freezing ratio is the measure of frozen weights to non-frozen weights.

Example approaches disclosed herein utilize a neural network architecture, which achieves a small hardware footprint, low power, low cost, and high efficiency. In one example, the neural network architecture describe herein may be referred to as SemifreddoNets.

Figure 4:
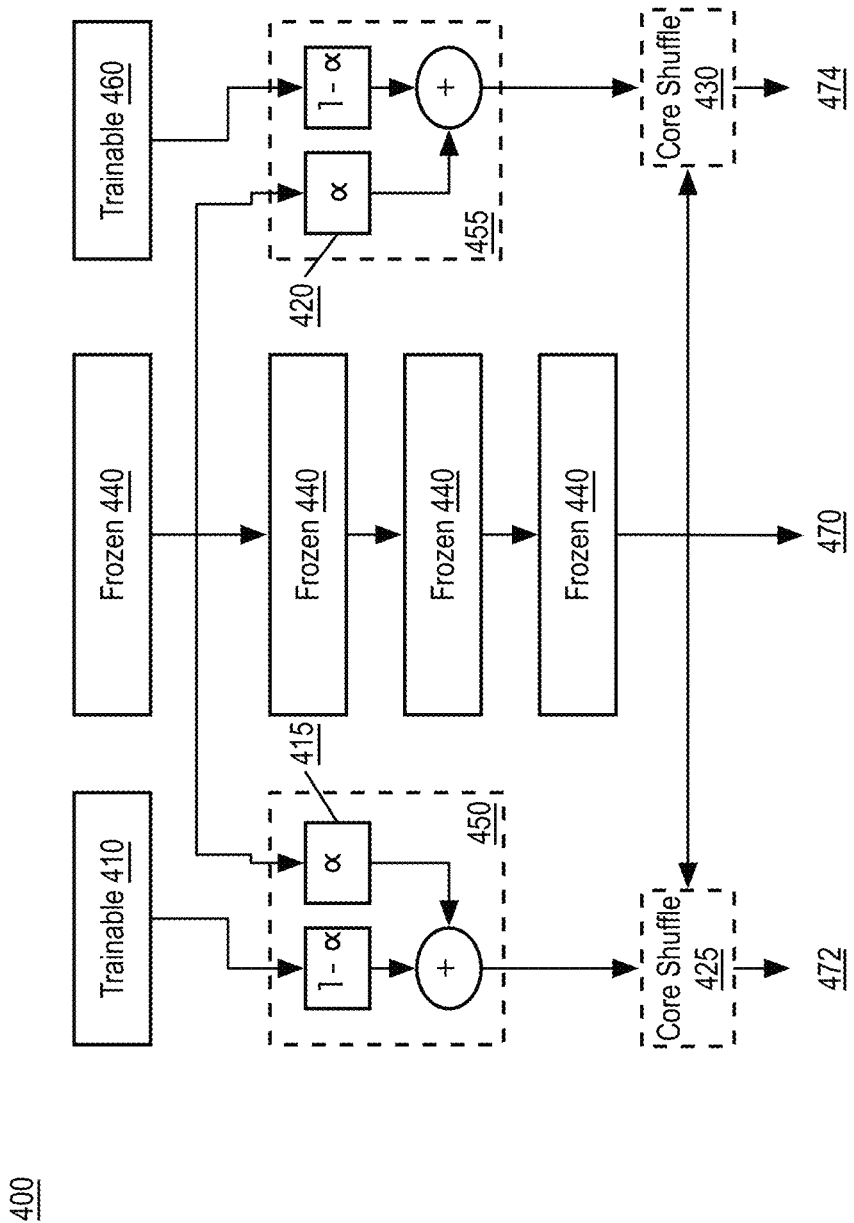
FIG. 4 is a diagram illustrating example layers with frozen weights in a machine learning model.

FIG. 4 is a diagram illustrating an example hardware block 400 having layers with partially-frozen weights used to implement a machine learning model. In some implementations, the hardware block 400 may be used as a building block of a fixed-topology neural network having partially-frozen weights used to implement a machine learning model. In examples disclosed herein, the hardware block 400 may include one frozen core 440 and two trainable cores 410, 460. It should be noted, however, that the number of cores in a hardware block may be configurable and is not limited to the depiction herein.

In some examples, the trainable cores 410, 460 may have fewer layers than the frozen core 440, and therefore are smaller. Both the frozen 440 and trainable cores 410, 460 can have hard-wired topologies. In one implementation, the frozen core 440 is trained once, whereas the trainable cores 410, 460 can be trained separately for each given dataset and task. Before the weights are fixed in the frozen layer 440 of the hardware block 400, the frozen core 440 can also be trained on other datasets in a multi-task setting depending on the use cases of the resultant machine learning model. In some implementations, the frozen core 440 can provide features that are general-purpose enough for the target applications. The trainable cores 410, 460 can selectively transfer (e.g., enrich) the features from the frozen core 440 using trainable alpha blending parameters, e.g., to enable the trainable cores 410, 460 to provide application-specific features, as described further below. In one implementation, an alpha blending layer (of the trainable cores 410, 460) is utilized to selectively transfer, using the trainable alpha blending parameters, first features associated with fixed weights of the frozen core 440. The transferred first features may be associated with trainable weights of the one or more trainable cores 410, 460. In one implementation, the trainable alpha blending parameters are a function of a trainable parameter, a sigmoid function, and outputs of frozen and trainable blocks in a preceding layer of the machine learning model.

The trainable cores 410, 460 selectively transfer features from the frozen core 440 using trainable alpha blending parameters 415, 420 at a trainable alpha blending layer 450, 455. The modular architecture of hardware block 400 allows for both of (1) using each core 410, 440, 460 independently, to perform different tasks, or (2) in conjunction with each other to perform a single task with higher representational power. The optional core shuffle modules 425, 430 allow the two trainable cores 410, 460 to exchange feature maps when both trainable cores 410, 460 are trained to do the same task.

In examples disclosed herein, the trainable alpha blending layer 450, 455, for each input channel, can implement a trainable alpha blending function defined as:

$$\alpha = \sigma(\omega);$$

$$y = \alpha * xf + (1-\alpha) * xt$$

In the definition above, ω may be a randomly initialized trainable parameter, σ may be the sigmoid function, and xf and xt are the outputs of the preceding layers. The trainable alpha blending layers 450, 455 act as a gating mechanism between the cores 410, 440, 460 and help the model decide the strength of transfer learning on a feature map basis. Although the alpha blending parameters 415, 420 may be learned during training, they may also be manually set to a particular value to enforce certain behavior. For example, setting alpha blending parameters 415, 420 to zero can separate all three cores 410, 440, 460 by disabling the data flow between the cores. Similarly, setting alpha blending parameters 415, 420 to 0.5 would turn the trainable cores into residual feature extractors.

In some examples, when two trainable cores 410, 460 are used for one task, feature maps are shuffled between the trainable cores 410, 460 by swapping half of the feature maps at the output of each trainable alpha blending layer 450, 455 at the core shuffle layers 425, 430. This cross-core channel shuffling can help both cores 410, 460 act as a single network more efficiently.

In some examples, the alpha blending layers 450, 455 between the frozen core 440 and the trainable cores 410, 460 require the shape of the input feature maps to match. Therefore, all cores have intermediate feature maps that match in size. The trainable cores 410, 460 may be made smaller by carving out some of the repeated layers (rather than reducing the number of trainable kernels per layer) while keeping both cores 410, 460 in synch with each other in the pipeline of the hardware block 400.

In the examples disclosed herein, the three cores 410, 440, 460 act as a backbone network that feeds feature maps to application-specific model heads for up to three different tasks at a time. The cores 410, 440, 460 can run both independently and together with each other. For example, output 470 of the frozen core 440 can be used for image classification, the output 472 of the first trainable core 410 can be used for object detection, and the output 474 of the second trainable core 460 can be used for semantic segmentation. Any neural network architecture can be used to implement the model macro architecture depicted in hardware block 400, as further described with respect to FIG. 5.

Figure 5:
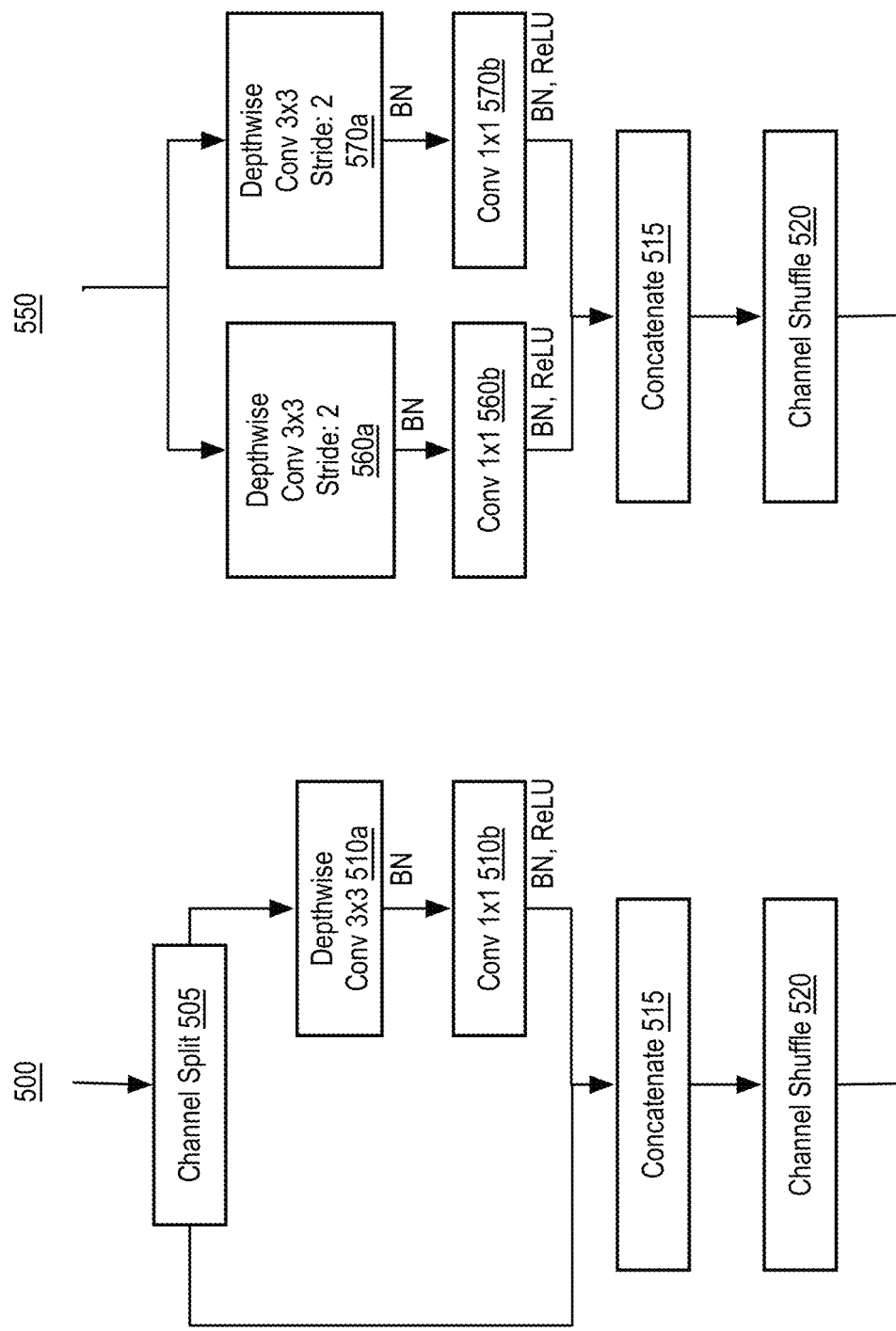
FIG. 5 is a diagram illustrating example implementations of a partially frozen machine learning model block.

FIG. 5 is a diagram illustrating example implementation of a partially frozen machine learning model block. The example described in FIG. 5 is a network topology that is based on the ShuffleNetV2 to implement the building blocks of the model. In one example, the implementation depicted in FIG. 5 may be used to implement each layer of trainable 410, 460 and frozen 440 cores described with respect to FIG. 1. Specifically, each component labeled 410, 440, 460 in FIG. 4 may have the architectural structure depicted with respect to FIG. 5, for example. However, other neural network architectures may also be utilized, and implementations of the disclosure are not limited to the depiction discussed herein. For example, a MobileNetV2 architecture may be utilized in lieu of the ShuffleNetV2 architecture, etc.

Example implementation system 500 depicts regular building blocks of a ShuffleNetV2 architecture. System 500 includes a channel split 505, followed by depthwise separable convolution 510a, 510b, channel concatenation 515, and uniform channel shuffle 520. Example implementation system 550 depicts downscaling blocks of a ShuffleNetV2 architecture. The convolution blocks 560a, 570a of system 550 that downsample their inputs skip the channel split 505 (of system 500), and use a stride of two in the depthwise convolutions 560a, 570a. A 1×1 convolution block 560b, 570b is also implemented prior the channel concatenation 515. Therefore, system 550 is capable of doubling the number of channels while reducing the feature map size by a factor of two in both horizontal and vertical axes.

In implementations of the disclosure, the hardware building block of a fixed-topology neural network having partially-frozen weights described with respect to FIG. 4 can be repeated multiple times in a neural network architecture. FIG. 6 is a table 600 describing an example architectural implementation of a machine learning model with the partially frozen building blocks. Each building block that includes parallel trainable and frozen layers, as described in FIG. 4, may be identified as a Semifreddo module in the table 600 of FIG. 6. As shown, the example machine learning model neural network architecture consists of repeated blocks of Semifreddo modules. Each super-row (e.g., rows with more than one value in the stride or repeat columns) in the table 600 of FIG. 6 corresponds to one Semifreddo block. A number of repetitions indicates the number of trainable and frozen hardware building blocks (e.g., Semifreddo modules). With reference to FIG. 4, for example, the frozen parts 440 have 4 blocks whereas trainable parts 410, 460 have 1 block. This is in line with the table 600 of FIG. 6. Frozen parts 440 have a total of 4 blocks (i.e., 1 with stride 1 or 2, 3 with stride 1) and trainable parts 410, 460 have 1 with stride 1 or 2).

In some examples, using the building blocks described herein (e.g., Semifreddo modules) to freeze a model vertically may produce comparable results to freezing a certain percentage of parameters in each layer uniformly while providing additional benefits. One example advantage of using the building blocks described herein (e.g., Semifreddo modules) rather than fully uniform freezing is the ease of implementation. For example, additional code at the optimizer level may be utilized to implement uniform weight freezing. However, the frozen and trainable parts in the building blocks herein may easily be defined in any mainstream deep learning framework and trained without modifying the parameter update mechanisms in the underlying framework. Another advantage of using the building block described herein to freeze a model vertically is the ability to decouple the frozen and trainable cores. This modular architecture allows for training the trainable and frozen cores separately for different tasks.

As described above with respect to FIG. 1, the backbone network of the model in an example system outputs feature maps that can be further processed to perform a particular computer vision task. Those feature maps can be used as-is in a host system that has additional computing capabilities, such as having a digital signal processor. To build a stand-alone system, the example system can implement a multi-purpose model head block (e.g., built by model head generator 140) that can perform basic computer vision tasks, without relying on the compute capabilities of a host system.

The multi-purpose head implements a neural network head that inputs feature maps and produces output for a given particular task. One challenge associated with a fully-pipelined, fixed-topology neural network head is that the shape of the output dimension can vary greatly depending on the task. Therefore, at least the output layer of a multi-purpose neural network is implemented in fully programmable systems. However, a host system might not have additional hardware that is used to process raw feature maps.

In some examples, a multi-purpose head may be implemented as a single 1×1 convolution layer, followed by a configurable activation function. In some examples, the activation function is approximated using a piecewise linear function.

In other examples, an optional global average pooling operator precedes the 1×1 convolutional layer. The global average pooling may be implemented as a running-average accumulator in a line-based-system. The global average pooling may be enabled when the entire image is to be analyzed to make a single prediction, such as image classification and face authentication. The global average pooling may be disabled for the tasks that require spatial granularity, such as object detection and image segmentation.

In some examples, the model head supports up to 131072 configurable weights of 12 bits and may be stored in SRAM. Those parameters may be sufficient for many types of computer vision tasks. For example, given 256-channel feature maps from each trainable core, the model head would be able to classify up to 256 kinds of scenes and segments up to 256 types of objects simultaneously. The model head supports group convolutions to handle larger outputs while staying within the limits of the total number of configurable weights. In other examples, for more sophisticated tasks, the model may include the option to output the feature maps and implementing a complex model head on the host device.

In the examples described herein, fixing the model topology helped to design a highly-efficient neural network hardware building block. As different tasks may utilize models having varying levels of capacities, implementations of the disclosure further provide a modular design scheme to adjust the model depth without duplicating the logic in the hardware. In one example, the modular design scheme implements deeper and larger network architectures by cycling the feature maps over the same hardware blocks. In particular, a last trainable hardware building block (e.g., Semifreddo blocks) and the model head may be designed to cycle feature maps repeatedly.

Figure 7:
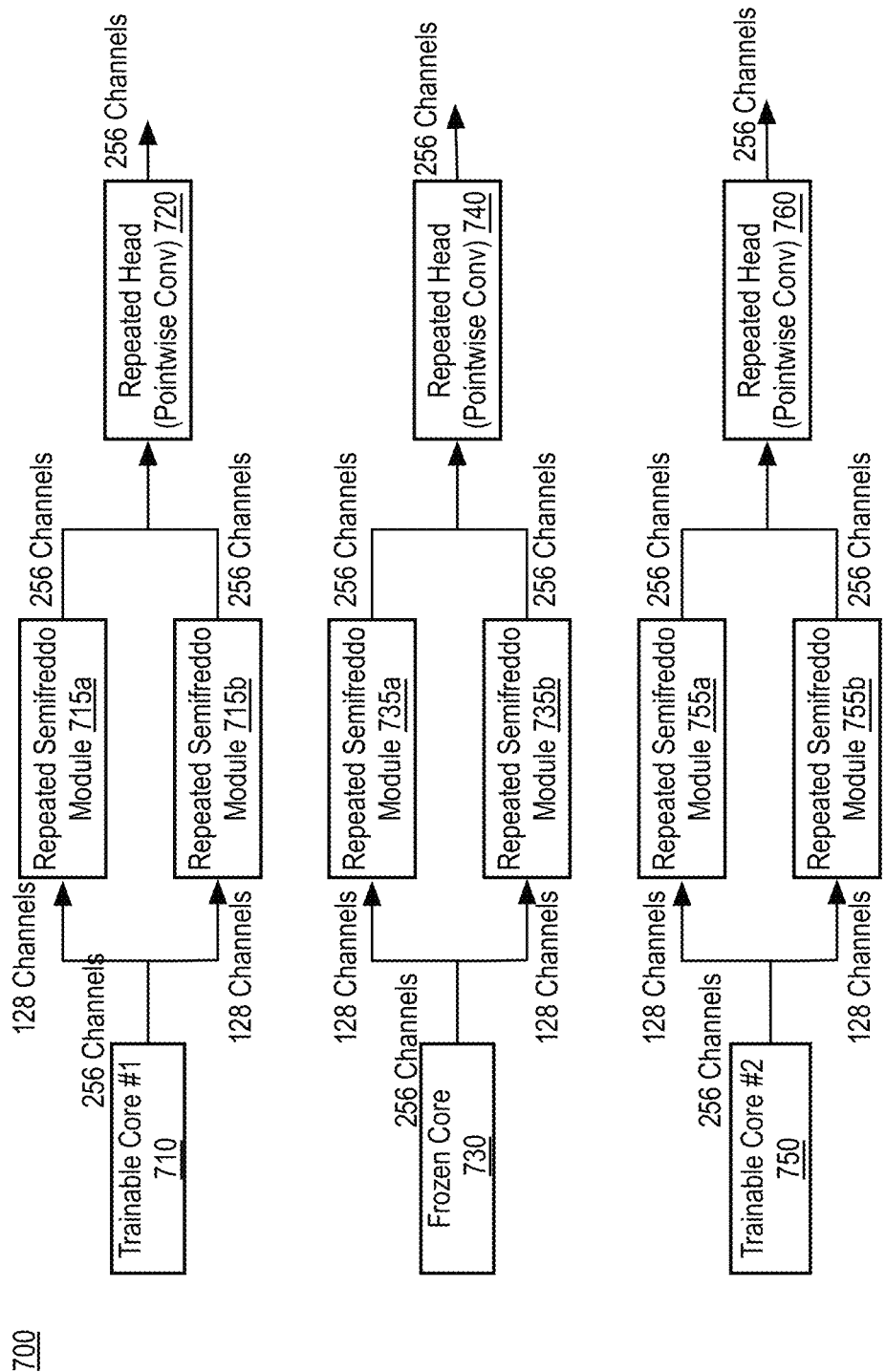
FIG. 7 is a diagram illustrating example implementations of repeatable blocks in a partially frozen machine learning model.

FIG. 7 is a diagram illustrating example implementation 700 of repeatable partially frozen machine learning model building blocks. Implementations of the disclosure reuse the partially frozen building blocks repeatedly in a single inference pass to improve model accuracy. Outputs from trainable cores 710, 750 and a frozen core 730 are split into two 128 channel groups and fed to repeated Semifreddo modules 715a, 715b, 735a, 735b, 755a, 755b. The repeated Semifreddo modules 715a, 715b, 735a, 735b, 755a, 755b may be the same as hardware block 400 described with respect to FIG. 4. Data output from repeated Semifreddo modules 715a, 715b, 735a, 735b, 755a, 755b may be looped over the repeated Semifreddo modules 715a, 715b, 735a, 735b, 755a, 755b as many times as configured. An output of the repeated Semifreddo modules 715a, 715b, 735a, 735b, 755a, 755b may then be passed to repeated heads 720, 740, 760 for processing, where repeated heads 720, 740, 760 may also be repeatable blocks capable of looping data back on itself for improved accuracy.

When reusing the building blocks for different layers, the weights should be reloaded each time an existing hardware block is used in place of a new one. Therefore, implementing larger models can come at the cost of lower inference speeds. Nevertheless, the block modularity provides the flexibility to find a reasonable balance between accuracy and speed, given a set of requirements.

Figure 8A:
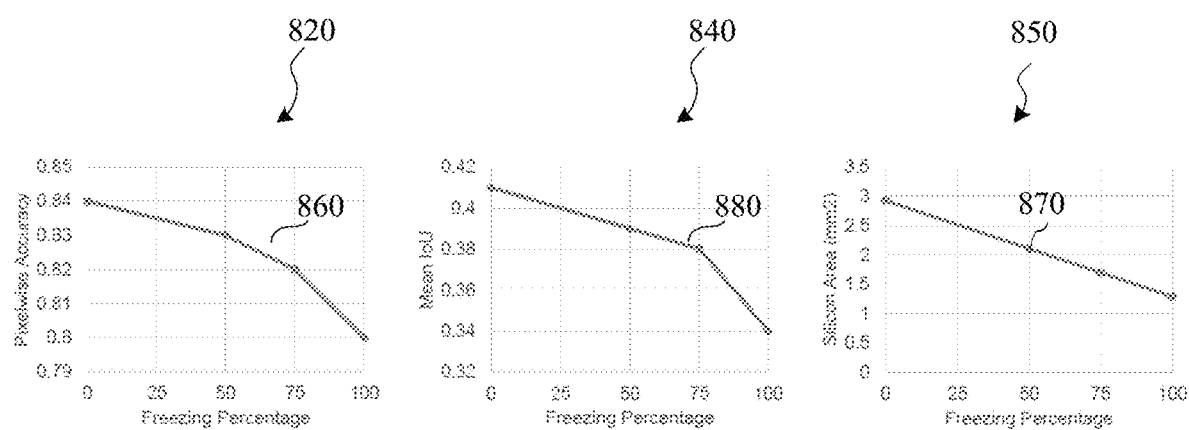
FIG. 8A is a set of graphs describing example performance statistics of example machine learning models with varying amounts of frozen weights.

FIG. 8A is a set of graphs describing example performance statistics of example machine learning models with varying amounts of frozen weights. In some examples, a larger frozen portion of the network can result in lower pixelwise accuracy 820, mean intersection over union 840, and silicon area 850. Performance drops 860, 870, 880 are depicted for each of the pixelwise accuracy 820, mean intersection over union 840, and silicon area 850. The largest performance drop 860, 880 occurred between the 75% and 100% freezing ratios. Therefore, in some examples, an effective freezing ratio in a final backbone model may be 77% for using a single trainable core, or 54% for using both of the trainable cores. Freezing ratios can be determined to provide a good trade-off between accuracy and silicon area.

FIG. 8B is a table describing example performance statistics of an example machine learning model and an example machine learning model with partially frozen weights. Note that the performance statistics presented in FIGS. 8A and 8B are exemplary. Actual performance statistics should be expected to differ. To evaluate the value of the frozen features and the trainable cores, a set of experiments can be performed covering different configurations of the partially frozen model 810, 815 on different types of tasks 822, 824, 826. In the example described in FIG. 8B, three computer vision tasks were used 822, 824, 826 with varying levels of similarity to the task that the frozen core was pre-trained for: image classification 822, pixelwise semantic segmentation 824, and face classification 826.

The first example task 822, image classification on the ImageNet challenge dataset, used a training setup identical to the frozen core pretraining. Therefore, the first task was expected to benefit from the frozen core the most. The second task 824, semantic segmentation, used the Cityscapes dataset, which has a different distribution than ImageNet and used more granular predictions than plain image classification. The third task 826, face classification, used the VGGFace2 and LWF face datasets for training and test, respectively. Those datasets also had a different data distribution than ImageNet, even more so as compared to Cityscapes.

As a benchmark, fully trainable ShuffleNetV2 backbone networks 815 can be used on the same tasks 822, 824, 826. In ShuffleNetV2 models 815, width multipliers of 0.5 and 1.0 were used to get backbone networks that are closest to the example partially frozen models of implementations of the disclosure, in terms of the hardware footprint and the total number of parameters.

In the example image classification task 822, an example model head (e.g., SemifreddoNets 810) was used. Since the model head is too large to run on the example partially frozen model head block, the example head in this experiment is assumed to run on a DSP. In the semantic segmentation task 824 and the face classification task 826, the example partially frozen model head block 810 was used. The example model head block 810 produced 16× downscaled label maps, and global average pooled face embedding vectors for the segmentation and face classification task respectively.

In the example experiments, the value of frozen features diminished as the target tasks diverted away from the original use case. The frozen core provided the most value in the image classification task and benefited the semantic segmentation. Although at a lesser extent, using the frozen core improved the accuracy also in the face classification task.

Using both trainable cores for the same task improved the performance in all tasks when the core shuffling is enabled. Core shuffling improved the results despite having a negligible cost in hardware.

While an example manner of implementing the example model generator 100 is illustrated in FIG. 1, one or more of the elements, processes and/or devices illustrated in FIG. 1 may be combined, divided, re-arranged, omitted, eliminated and/or implemented in any other way. Further, the example model trainer 110, the example weight selector 120, the example weight freezer 130, the example model head generator 140, the example model provider 170, and/or, more generally, the example model generator 100 of FIG. 1 may be implemented by hardware, software, firmware and/or any combination of hardware, software and/or firmware. Thus, for example, any of the example model trainer 110, the example weight selector 120, the example weight freezer 130, the example model head generator 140, the example model provider 170, and/or, more generally, the example model generator 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example model trainer 110, the example weight selector 120, the example weight freezer 130, the example model head generator 140, and/or the example model provider 170 is/are hereby expressly defined to include a non-transitory computer readable storage device or storage disk such as a memory, a digital versatile disk (DVD), a compact disk (CD), a Blu-ray disk, etc. including the software and/or firmware. Further still, the example model generator 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
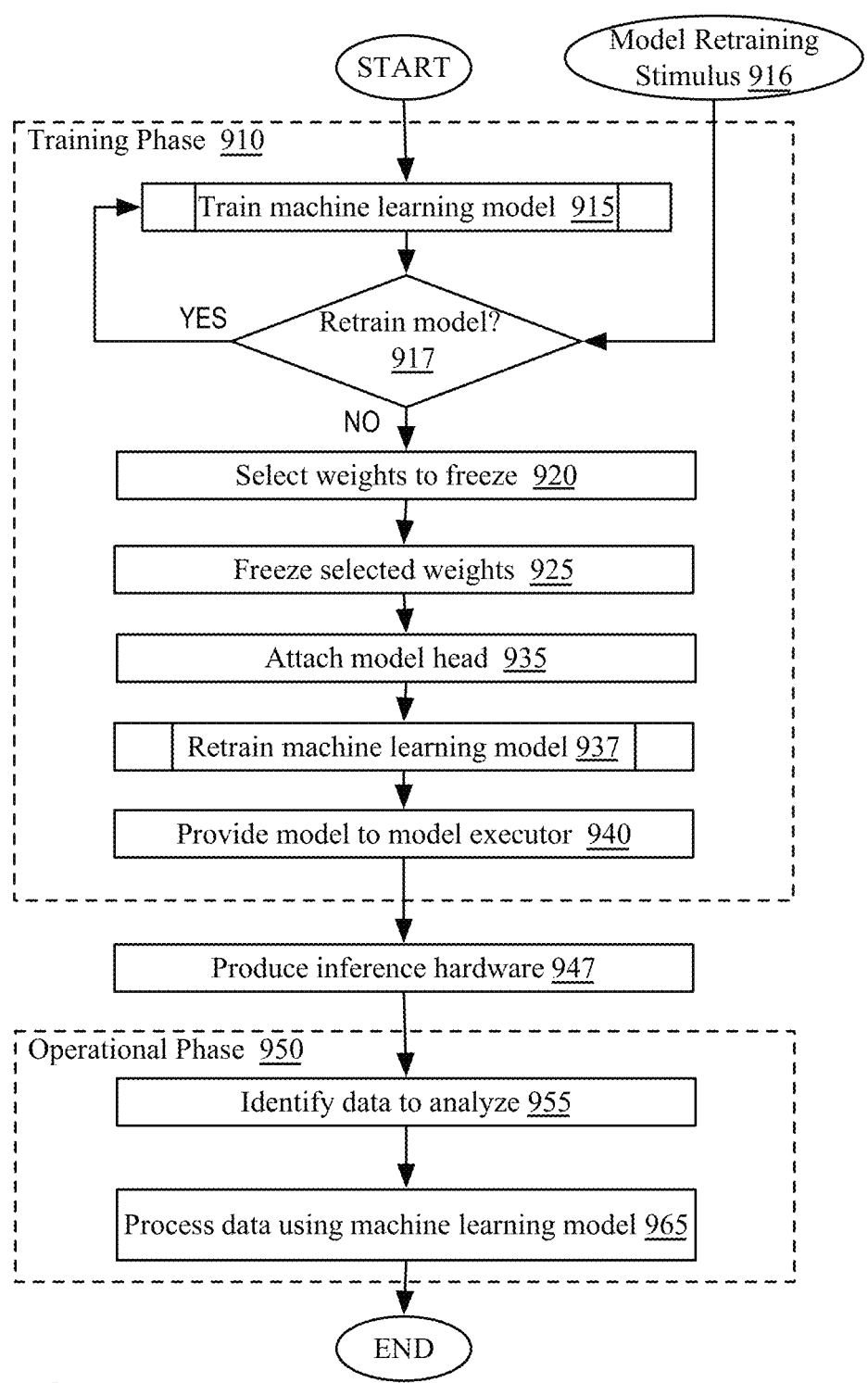
FIG. 9 is a flowchart representative of machine-readable instructions which may be executed to implement an example model generator.

FIG. 9 is a flow diagram illustrating an embodiment of a method 900 for implementing the example model generator of FIG. 1. Method 900 may be performed by processing logic that may comprise hardware (e.g., circuitry, dedicated logic, programmable logic, etc.), software (such as instructions run on a processing device), or a combination thereof. More particularly, the method 900 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 900 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-8 may not be repeated or discussed hereafter. In one implementation, a model generator, such as model generator 100 of FIG. 1, may perform method 900.

The training phase 910 of the program of FIG. 9 includes an example model trainer 110, an example weight selector 120, an example weight freezer 130, an example model head generator 140, and an example model provider 170. The example model trainer 110 trains the machine learning model. (Block 915). In examples disclosed herein, the model trainer 110 trains each of the cores with the same training and validation data. However, other methods of training the model can additionally and/or alternatively be used. For example, the model trainer 110 can select a subset of the model cores (e.g., one core, two cores, etc.) and train the selected subset. Furthermore, in the example disclosed herein, the model trainer 110 utilizes one or more hardware building blocks (e.g., Semifreddo modules) to partially freeze parameters of a model vertically during the training, as described herein.

If the example model trainer 110 determines that the model should be retrained (e.g., block 917 returns a value of YES), the example model trainer 110 retrains the model. In examples disclosed herein, the model trainer 110 may determine whether the model should be retrained based on a model retraining stimulus. (Block 916). In some examples, the model retraining stimulus 916 may be whether the number of weights that have been frozen exceeds a retrain limit threshold. In other examples, the model retraining stimulus 916 may be a user indicating that the model should be retrained. In some examples, the training phase 910 may begin at block 917, where the model trainer 110 determines whether initial training and/or subsequent training is to be performed. That is, the decision of whether to perform training may be performed based on, for example, a request from a user, a request from a system administrator, an amount of time since prior training being performed having elapsed (e.g., training is to be performed on a weekly basis, etc.), the presence of new training data being made available, etc.

Once the example model trainer 110 has retrained the model, or if the example model trainer 110 determines that the model should not be retrained (e.g., block 917 returns a value of NO), the example weight selector 120 selects weights in the machine learning model to freeze. (Block 920). In examples disclosed herein, the weight selector 120 selects a random set of weights in each layer until a ratio of frozen to non-frozen weights is met. However, any other methods to select weights to freeze can additionally and/or alternatively be used.

The example weight freezer 130 freezes the weights selected by the example weight selector 120. (Block 925). In examples disclosed herein, the weight freezer 130 freezes weights by setting the value of the weight to a hard-coded scalar. However, any other methods to freeze a weight can additionally and/or alternatively be used.

In the illustrated example of FIG. 9, selection and freezing of weights (e.g., blocks 920 and 925) is performed in response to training of the machine learning model. However, in some examples, the selection and freezing of weights (blocks 920, 925) might not be performed after every training event. In some examples, selection and freezing of weights is performed only after initial training of the machine learning model. In this manner, additional weights of the model do not inadvertently become frozen upon subsequent training.

The example model head generator 140 attaches a model head to the trained model. (Block 935). In some examples, the model head includes a single 1×1 convolution layer. In other examples, the model head includes a configurable activation operator (e.g., a rectifier). In further examples, the model head includes a global average pooling operator.

Once the model head has been attached to the model, the example model trainer 110 may train the model head and the non-frozen weights. (Block 937). In some examples, the model head and non-frozen weights are trained for a specified target task (e.g., image classification).

The example model provider 170 provides the model to a model executor. (Block 940). In examples disclosed herein, the model provider 170 provides the model to a system to convert the model into a fully pipelined inference hardware format having both trainable and frozen weights. (Block 947). In other examples, the model provider 170 provides the model over a network such as the Internet.

The operational phase 950 of the program of FIG. 9 then begins. During the operational phase 950, once the model head has been attached to the model, a model executor identifies data to be analyzed by the model. (Block 955). In some examples, the data may be images to classify. The model executor processes the data using the machine learning model provided by the model provider 170. (Block 965). In some examples, the model executor may process the data using the model to generate an output indicative of whether the data represents an object (e.g., classified as a stop sign). In other examples, the model executor may process the data using the model to generate an output associating a user with an image of a face.

Figure 10:
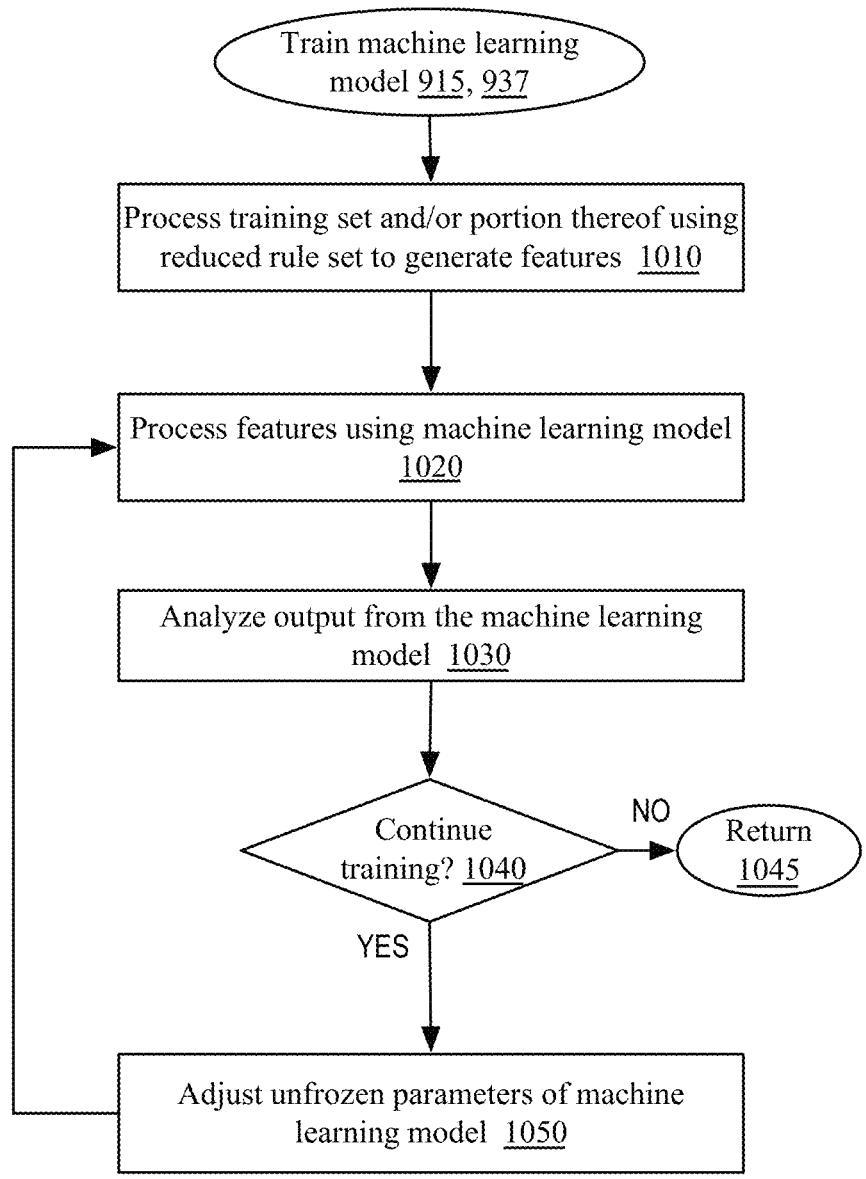
FIG. 10 is a flowchart representative of machine-readable instructions with may be executed to implement an example model trainer.

FIG. 10 is a flow diagram illustrating an embodiment of a method 915, 937 for training a machine learning model using the example model generator of FIG. 1. Method 1000 may be performed by processing logic that may comprise hardware (e.g., circuitry, dedicated logic, programmable logic, etc.), software (such as instructions run on a processing device), or a combination thereof. More particularly, the method 1000 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 1000 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-8 may not be repeated or discussed hereafter. In one implementation, a model generator, such as model generator 100 of FIG. 1, may perform method 1000.

The example process 915 of FIG. 10 begins when the example model trainer 110 processes the training data using the reduced rule set to generate features that will be used as inputs to the machine learning model. (Block 1010). These features and their associated labels, if any, are used by to the example model trainer 110 for the creation of the machine learning model.

The example model trainer 110 utilizes a training algorithm to train a model to operate in accordance with patterns and/or associations based on, for example, training data (e.g., the features and expected outputs). In general, the model includes internal parameters that guide how input data is transformed into output data, such as through a series of nodes and connections within the model to transform input data into output data. Additionally, hyperparameters may be used as part of the training process to control how the learning is performed (e.g., a learning rate, a number of layers to be used in the machine learning model, etc.). Hyperparameters are defined to be training parameters that are determined prior to initiating the training process.

The example model trainer 110 process the features and/or a portion thereof using the machine learning model stored in the model datastore 150. (Block 1020). The example model trainer 110 reviews the output of the model execution to determine an amount of error of the machine learning model. (Block 1030). For example, the model trainer 110 reviews the outputs of the machine learning model to determine whether the outputs from the model match the expected labeled outputs.

The example model trainer 110 determines whether to continue training. (Block 1040). In examples disclosed herein, the example model trainer 110 determines whether to continue training based on whether the calculated amount of error (determined at block 1030) exceeds a threshold amount of error. (Block 1040). If model training is to proceed (e.g., block 1040 returns a result of YES), the example model trainer 110 adjusts the unfrozen parameters of the machine learning model. (Block 1050). In some examples, the amount of adjustment to the parameters of the machine learning model is based on the calculated amount of error. Control then proceeds to block 1020, where the process of blocks 1020 through 1050 is repeated until the calculated amount of error is less than the threshold amount of error (e.g., until block 1040 returns a result of NO and the machine learning model training ends at return block 1045). In some examples, the weight selector 120 and weight freezer 130 may select, freeze, and/or unfreeze additional weights during the model training process 915. In other examples, weights may be selected and/or frozen before the model is trained.

Figure 11:
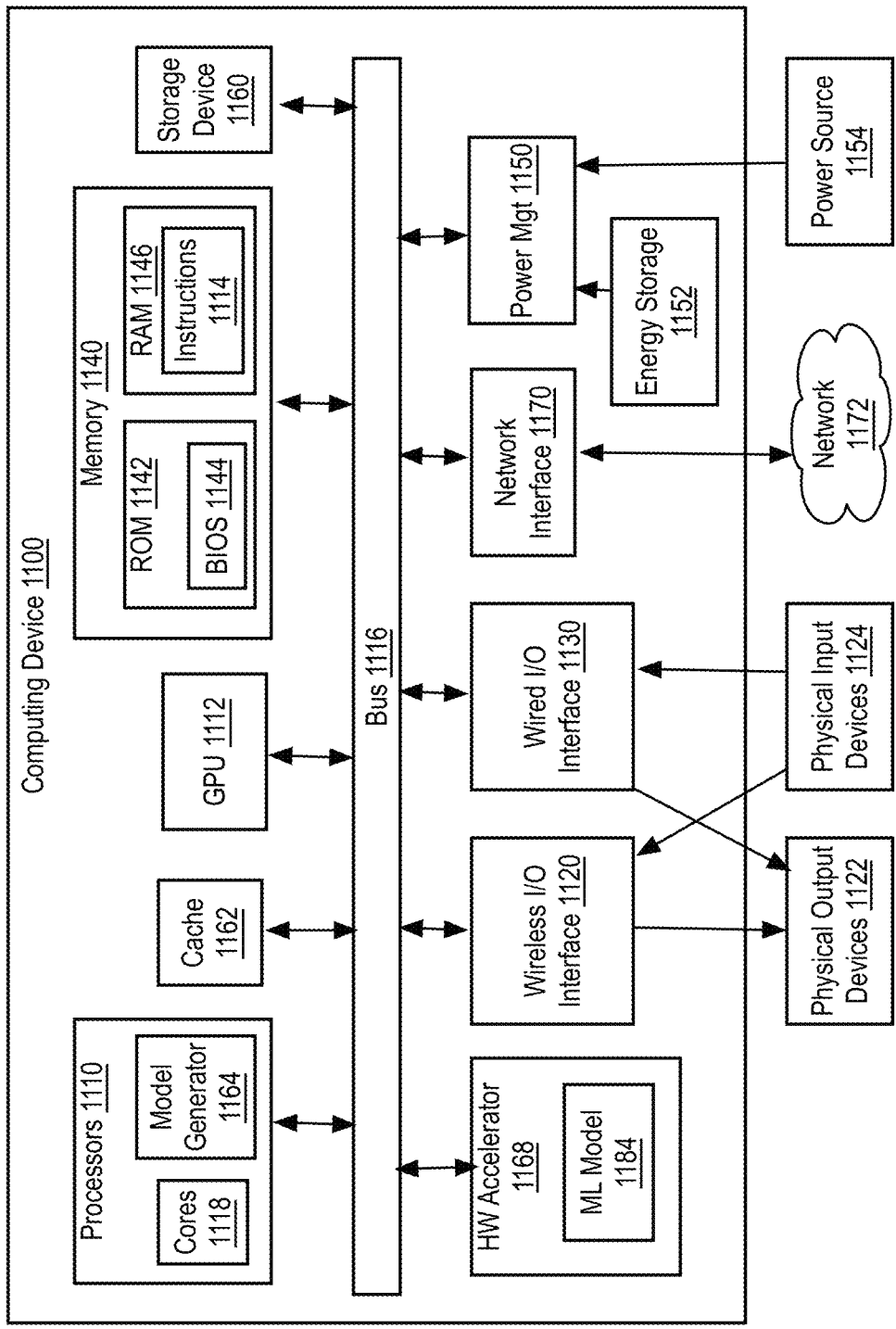
FIG. 11 is a schematic diagram of an illustrative electronic computing device to enable partially-frozen neural networks for efficient computer vision systems, according to some embodiments.

FIG. 11 is a schematic diagram of an illustrative electronic computing device to enable partially-frozen neural networks for efficient computer vision systems, according to some embodiments. In some embodiments, the computing device 1100 includes one or more processors 1110 including one or more processors cores 1118 and a model generator 1164, the model generator 1164 to enable partially-frozen neural networks for efficient computer vision systems, as provided in FIGS. 1-10. In some embodiments, the computing device 1100 includes a hardware accelerator 1168, the hardware accelerator including a machine learning model 1184. In some embodiments, the computing device is to implement partially-frozen neural networks implementing the machine learning model 1184 for efficient computer vision systems, as provided in FIGS. 1-10.

The computing device 1100 may additionally include one or more of the following: cache 1162, a graphical processing unit (GPU) 1112 (which may be the hardware accelerator in some implementations), a wireless input/output (I/O) interface 1120, a wired I/O interface 1130, memory circuitry 1140, power management circuitry 1150, non-transitory storage device 1160, and a network interface 1170 for connection to a network 1172. The following discussion provides a brief, general description of the components forming the illustrative computing device 1100. Example, non-limiting computing devices 1100 may include a desktop computing device, blade server device, workstation, or similar device or system.

In embodiments, the processor cores 1118 are capable of executing machine-readable instruction sets 1114, reading data and/or instruction sets 1114 from one or more storage devices 1160 and writing data to the one or more storage devices 1160. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 1114 may include instructions to implement partially-frozen neural networks for efficient computer vision systems, as provided in FIGS. 1-10.

The processor cores 1118 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 1100 includes a bus or similar communications link 1116 that communicably couples and facilitates the exchange of information and/or data between various system components including the processor cores 1118, the cache 1162, the graphics processor circuitry 1112, one or more wireless I/O interfaces 1120, one or more wired I/O interfaces 1130, one or more storage devices 1160, and/or one or more network interfaces 1170. The computing device 1100 may be referred to in the singular herein, but this is not intended to limit the embodiments to a single computing device 1100, since in certain embodiments, there may be more than one computing device 1100 that incorporates, includes, or contains any number of communicably coupled, collocated, or remote networked circuits or devices.

The processor cores 1118 may include any number, type, or combination of currently available or future developed devices capable of executing machine-readable instruction sets.

The processor cores 1118 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 11 are of conventional design. Consequently, such blocks need not be described in further detail herein, as they will be understood by those skilled in the relevant art. The bus 1116 that interconnects at least some of the components of the computing device 1100 may employ any currently available or future developed serial or parallel bus structures or architectures.

The system memory 1140 may include read-only memory ("ROM") 1142 and random access memory ("RAM") 1146. A portion of the ROM 1142 may be used to store or otherwise retain a basic input/output system ("BIOS") 1144. The BIOS 1144 provides basic functionality to the computing device 1100, for example by causing the processor cores 1118 to load and/or execute one or more machine-readable instruction sets 1114. In embodiments, at least some of the one or more machine-readable instruction sets 1114 cause at least a portion of the processor cores 1118 to provide, create, produce, transition, and/or function as a dedicated, specific, and particular machine, for example a word processing machine, a digital image acquisition machine, a media playing machine, a gaming system, a communications device, a smartphone, or similar.

The computing device 1100 may include at least one wireless input/output (I/O) interface 1120. The at least one wireless I/O interface 1120 may be communicably coupled to one or more physical output devices 1122 (tactile devices, video displays, audio output devices, hardcopy output devices, etc.). The at least one wireless I/O interface 1120 may communicably couple to one or more physical input devices 1124 (pointing devices, touchscreens, keyboards, tactile devices, etc.). The at least one wireless I/O interface 1120 may include any currently available or future developed wireless I/O interface. Example wireless I/O interfaces include, but are not limited to: BLUETOOTH®, near field communication (NFC), and similar.

The computing device 1100 may include one or more wired input/output (I/O) interfaces 1130. The at least one wired I/O interface 1130 may be communicably coupled to one or more physical output devices 1122 (tactile devices, video displays, audio output devices, hardcopy output devices, etc.). The at least one wired I/O interface 1130 may be communicably coupled to one or more physical input devices 1124 (pointing devices, touchscreens, keyboards, tactile devices, etc.). The wired I/O interface 1130 may include any currently available or future developed I/O interface. Example wired I/O interfaces include, but are not limited to: universal serial bus (USB), IEEE 1394 ("FireWire"), and similar.

The computing device 1100 may include one or more communicably coupled, non-transitory, data storage devices 1160. The data storage devices 1160 may include one or more hard disk drives (HDDs) and/or one or more solid-state storage devices (SSDs). The one or more data storage devices 1160 may include any current or future developed storage appliances, network storage devices, and/or systems. Non-limiting examples of such data storage devices 1160 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1160 may include one or more removable storage devices, such as one or more flash drives, flash memories, flash storage units, or similar appliances or devices capable of communicable coupling to and decoupling from the computing device 1100.

The one or more data storage devices 1160 may include interfaces or controllers (not shown) communicatively coupling the respective storage device or system to the bus 1116. The one or more data storage devices 1160 may store, retain, or otherwise contain machine-readable instruction sets, data structures, program modules, data stores, databases, logical structures, and/or other data useful to the processor cores 1118 and/or graphics processor circuitry 1112 and/or one or more applications executed on or by the processor cores 1118 and/or graphics processor circuitry 1112. In some instances, one or more data storage devices 1160 may be communicably coupled to the processor cores 1118, for example via the bus 1116 or via one or more wired communications interfaces 1130 (e.g., Universal Serial Bus or USB); one or more wireless communications interfaces 1120 (e.g., Bluetooth®, Near Field Communication or NFC); and/or one or more network interfaces 1170 (IEEE 802.3 or Ethernet, IEEE 802.11, or Wi-Fi®, etc.).

Processor-readable instruction sets 1114 and other programs, applications, logic sets, and/or modules may be stored in whole or in part in the system memory 1140. Such instruction sets 1114 may be transferred, in whole or in part, from the one or more data storage devices 1160. The instruction sets 1114 may be loaded, stored, or otherwise retained in system memory 1140, in whole or in part, during execution by the processor cores 1118 and/or graphics processor circuitry 1112.

The computing device 1100 may include power management circuitry 1150 that controls one or more operational aspects of the energy storage device 1152. In embodiments, the energy storage device 1152 may include one or more primary (i.e., non-rechargeable) or secondary (i.e., rechargeable) batteries or similar energy storage devices. In embodiments, the energy storage device 1152 may include one or more supercapacitors or ultracapacitors. In embodiments, the power management circuitry 1150 may alter, adjust, or control the flow of energy from an external power source 1154 to the energy storage device 1152 and/or to the computing device 1100. The power source 1154 may include, but is not limited to, a solar power system, a commercial electric grid, a portable generator, an external energy storage device, or any combination thereof.

For convenience, the processor cores 1118, the graphics processor circuitry 1112, the wireless I/O interface 1120, the wired I/O interface 1130, the storage device 1160, and the network interface 1170 are illustrated as communicatively coupled to each other via the bus 1116, thereby providing connectivity between the above-described components. In alternative embodiments, the above-described components may be communicatively coupled in a different manner than illustrated in FIG. 11. For example, one or more of the above-described components may be directly coupled to other components, or may be coupled to each other, via one or more intermediary components (not shown). In another example, one or more of the above-described components may be integrated into the processor cores 1118 and/or the graphics processor circuitry 1112. In some embodiments, all or a portion of the bus 1116 may be omitted and the components are coupled directly to each other using suitable wired or wireless connections.

Flowcharts representative of example hardware logic, machine readable instructions, hardware implemented state machines, and/or any combination thereof for implementing the system 100 of FIG. 1 and system 400 (FIG. 4), for example, are shown in FIGS. 9 and/or 10. The machine readable instructions may be one or more executable programs or portion(s) of an executable program for execution by a computer processor such as the processor 1110 shown in the example computing device 1100 discussed above in connection with FIG. 11. The program may be embodied in software stored on a non-transitory computer readable storage medium such as a CD-ROM, a floppy disk, a hard drive, a DVD, a Blu-ray disk, or a memory associated with the processor 1110, but the entire program and/or parts thereof could alternatively be executed by a device other than the processor 1110 and/or embodied in firmware or dedicated hardware. Further, although the example program is described with reference to the flowcharts illustrated in FIGS. 9 and/or 10, many other methods of implementing the example systems 100, 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 9 and/or 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to facilitate partially-frozen neural networks for efficient computer vision systems. The apparatus of Example 1 comprises a frozen core to store fixed weights of a machine learning model; one or more trainable cores coupled to the frozen core, the one or more trainable cores comprising multipliers for trainable weights of the machine learning model; and an alpha blending layer to selectively transfer first features associated with the fixed weights of the frozen core, the transferred first features associated with the trainable weights of the one or more trainable cores.

In Example 2, the subject matter of Example 1 can optionally include wherein the frozen core and the one or more trainable cores are trained separately. In Example 3, the subject matter of any one of Examples 1-2 can optionally include wherein the frozen core and the one or more trainable cores run in parallel with one another. In Example 4, the subject matter of any one of Examples 1-3 can optionally include wherein a determined portion of weights are fixed weights across layers of the frozen core and the one or more trainable cores.

In Example 5, the subject matter of any one of Examples 1-4 can optionally include wherein the alpha blending layer includes a trainable alpha blending parameter, and wherein the trainable alpha blending parameter is a function of a trainable parameter, a sigmoid function, and outputs of frozen and trainable blocks in a preceding layer of the machine learning model. In Example 6, the subject matter of any one of Examples 1-5 can optionally include wherein a hardware block comprising the frozen core, the one or more trainable cores, and the alpha blending layer is repeated to implement the machine learning model. In Example 7, the subject matter of any one of Examples 1-6 can optionally include a core shuffle to shuffle feature maps generated by the one or more trainable cores.

In Example 8, the subject matter of any one of Examples 1-7 can optionally include wherein the frozen core and the one or more trainable cores comprise convolution circuitry to utilize at least one of the fixed weights or the trainable weights. In Example 9, the subject matter of any one of Examples 1-8 can optionally include wherein the frozen core comprises more layers than the one or more trainable cores.

Example 10 is a system for facilitating partially-frozen neural networks for efficient computer vision systems. The system of Example 10 can optional include a plurality of hardware building blocks having vertical, partially frozen weights. In Example 10, each of the plurality of hardware building blocks can comprise: a frozen core to store fixed weights of a machine learning model; one or more trainable cores coupled to the frozen core, the one or more trainable cores comprising multipliers for trainable weights of the machine learning model; and an alpha blending layer to selectively transfer first features associated with the fixed weights of the frozen core, the transferred first features associated with the trainable weights of the one or more trainable cores. In Example 10, the system can also optionally include a model head coupled to the plurality of hardware building blocks, the model head to extract a feature map from the plurality of hardware building blocks and generate an output vector.

In Example 11, the subject matter of Example 10 can optionally include wherein the output vector is used to perform a computer vision task. In Example 12, the subject matter of any one of Examples 10-11 can optionally include wherein the model head comprises a pointwise convolution layer having a configurable number of outputs. In Example 13, the subject matter of any one of Examples 10-12 can optionally include wherein the model head further implements a pooling operator and a configurable activation function.

In Example 14, the subject matter of any one of Examples 10-13 can optionally include wherein the frozen core and the one or more trainable cores are trained separately; and wherein the frozen core and the one or more trainable cores run in parallel with one another. In Example 15, the subject matter of any one of Examples 10-14 can optionally include wherein the model head is repeatable.

Example 16 is a method for facilitating partially-frozen neural networks for efficient computer vision systems. The method of Example 16 can include training a machine learning model; selecting an operation of the machine learning model; freezing a parameter of the operation, wherein the parameter is frozen according to a portion of parameters determined to be fixed in each layer of the machine learning model, and wherein each layer of the machine learning model comprises frozen parameters and trainable parameters; and re-training the machine learning model without modifying the parameter of the operation.

In Example 17, the subject matter of Example 16 can optionally include training the machine learning model using repeatable hardware blocks each comprising: a frozen core comprising at least one fixed scalar to store fixed weights of the machine learning model, wherein the frozen parameters comprise the fixed weights; one or more trainable cores coupled to the frozen core, the one or more trainable cores comprising multipliers for trainable weights of the machine learning model, wherein the trainable parameters comprise the trainable weights; and an alpha blending layer to selectively transfer first features associated with the fixed weights of the frozen core, the transferred first features associated with the trainable weights of the one or more trainable cores.

In Example 18, the subject matter of any one of Examples 16-17 can optionally include wherein the frozen core and the one or more trainable cores are trained separately. In Example 19, the subject matter of any one of Examples 16-18 can optionally include wherein the alpha blending layer includes a trainable alpha blending parameter, and wherein the trainable alpha blending parameter is a function of a trainable parameter, a sigmoid function, and outputs of frozen and trainable blocks in a preceding layer of the machine learning model. In Example 20, the subject matter of any one of Examples 16-19 can optionally include wherein each of the repeatable hardware blocks further comprise a core shuffle to shuffle feature maps generated by the one or more trainable cores.

Example 21 is at least one non-transitory machine readable storage medium for facilitating partially-frozen neural networks for efficient computer vision systems. The at least one non-transitory machine readable storage medium of Example 21 comprises instructions that, when executed, cause at least one processor to at least: train a machine learning model; select an operation of the machine learning model; freeze a parameter of the operation, wherein the parameter is frozen according to a portion of parameters determined to be fixed in each layer of the machine learning model, and wherein each layer of the machine learning model comprises frozen parameters and trainable parameters; and re-train the machine learning model without modifying the parameter of the operation.

In Example 22, the subject matter of Example 21 can optionally include wherein the instructions, when executed further cause the at least one processor to train the machine learning model using repeatable hardware blocks each comprising: a frozen core comprising at least one fixed scalar to store fixed weights of the machine learning model, wherein the frozen parameters comprise the fixed weights; one or more trainable cores coupled to the frozen core, the one or more trainable cores comprising multipliers for trainable weights of the machine learning model, wherein the trainable parameters comprise the trainable weights; and an alpha blending layer to selectively transfer first features associated with the fixed weights of the frozen core, the transferred first features associated with the trainable weights of the one or more trainable cores.

In Example 23, the subject matter of any one of Examples 21-22 can optionally include wherein the frozen core and the one or more trainable cores are trained separately. In Example 24, the subject matter of any one of Examples 21-23 can optionally include wherein the alpha blending layer includes a trainable alpha blending parameter, and wherein the trainable alpha blending parameter is a function of a trainable parameter, a sigmoid function, and outputs of frozen and trainable blocks in a preceding layer of the machine learning model. In Example 25, the subject matter of any one of Examples 21-24 can optionally include wherein each of the repeatable hardware blocks further comprise a core shuffle to shuffle feature maps generated by the one or more trainable cores.

Example 26 is an apparatus for facilitating partially-frozen neural networks for efficient computer vision systems according to implementations of the disclosure. The apparatus of Example 26 can comprise means for training a machine learning model; selecting an operation of the machine learning model; means for freezing a parameter of the operation, wherein the parameter is frozen according to a portion of parameters determined to be fixed in each layer of the machine learning model, and wherein each layer of the machine learning model comprises frozen parameters and trainable parameters; and means for re-training the machine learning model without modifying the parameter of the operation.

In Example 27, the subject matter of Example 26 can optionally include the apparatus further configured to perform the method of any one of the Examples 17 to 20.

Example 28 is at least one machine readable medium comprising a plurality of instructions that in response to being executed on a computing device, cause the computing device to carry out a method according to any one of Examples 16-20. Example 29 is an apparatus for facilitating partially-frozen neural networks for efficient computer vision systems, configured to perform the method of any one of Examples 16-20. Example 30 is an apparatus for facilitating partially-frozen neural networks for efficient computer vision systems comprising means for performing the method of any one of Examples 16 to 20. Specifics in the Examples may be used anywhere in one or more embodiments.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A method comprising:
   training a machine learning model using repeatable hardware blocks, respective repeatable hardware blocks including:
      one or more trainable cores coupled to a frozen core, the one or more trainable cores including multipliers for trainable weights of the machine learning model; and
      alpha blending layer circuitry to selectively transfer first features associated with fixed weights of the frozen core, the transferred first features associated with the trainable weights of the one or more trainable cores;
   selecting an operation of the machine learning model;
   freezing, by executing a machine readable instruction with at least one processor, a parameter of the operation, the parameter is frozen according to a portion of parameters to be fixed in each layer of the machine learning model, respective layers of the machine learning model including frozen parameters and trainable parameters, the trainable parameters including the trainable weights; and
   re-training, by executing a machine readable instruction with the at least one processor, the machine learning model without modifying the parameter of the operation.

2. The method of claim 1, wherein the respective repeatable hardware blocks include the frozen core, the frozen core including at least one fixed scalar to store the fixed weights of the machine learning model, the frozen parameters including the fixed weights.

3. The method of claim 2, further including training the frozen core and the one or more trainable cores separately.

4. The method of claim 2, wherein the alpha blending layer circuitry includes a trainable alpha blending parameter, and the trainable alpha blending parameter is a function of a trainable parameter, a sigmoid function, and outputs of frozen and trainable cores in a preceding layer of the machine learning model.

5. The method of claim 2, wherein the respective repeatable hardware blocks include a core shuffle to shuffle feature maps generated by the one or more trainable cores.

6. At least one non-transitory machine readable storage medium comprising instructions that, when executed, cause at least one processor to at least:
   train a machine learning model using repeatable hardware blocks, respective repeatable hardware blocks including:
      one or more first hardware cores coupled to a second hardware core, the one or more first hardware cores including multipliers for first weights of the machine learning model that can be adjusted after deployment of the machine learning model as compared to second weights of the second hardware core that are fixed; and
      alpha blending layer circuitry to selectively transfer first features associated with the second weights, the transferred first features associated with the first weights;
   select an operation of the machine learning model;
   freeze a parameter of the operation, the parameter to be frozen according to a portion of parameters to be fixed in each layer of the machine learning model, respective layers of the machine learning model including first parameters and second parameters, the first parameters including the first weights; and
   re-train the machine learning model without modifying the parameter of the operation.

7. The at least one non-transitory machine readable storage medium of claim 6, wherein the respective repeatable hardware blocks include the second hardware core including at least one fixed scalar to store the second weights of the machine learning model, the second parameters including the second weights.

8. The at least one non-transitory machine readable storage medium of claim 7, wherein the instructions, when executed, further cause the at least one processor to train the second hardware core and the one or more first hardware cores separately.

9. The at least one non-transitory machine readable storage medium of claim 7, wherein the alpha blending layer circuitry includes a trainable alpha blending parameter, and the trainable alpha blending parameter is a function of one of the first parameters, a sigmoid function, and outputs of one or more first hardware cores and a second hardware core in a preceding layer of the machine learning model.

10. The at least one non-transitory machine readable storage medium of claim 7, wherein the respective repeatable hardware blocks include a core shuffle to shuffle feature maps generated by the one or more first hardware cores.

11. An apparatus comprising:
    memory including machine-readable instructions; and
    at least one processor to execute the machine-readable instructions to at least:
       train a machine learning model using repeatable hardware blocks, respective repeatable hardware blocks including:
          one or more first hardware cores coupled to a second hardware core, the one or more first hardware cores including multipliers for first weights of the machine learning model that can be adjusted after deployment of the machine learning model as compared to second weights of the second hardware core that are fixed; and
          alpha blending layer circuitry to selectively transfer first features associated with the second weights, the transferred first features associated with the first weights;
       select an operation of the machine learning model;
       freeze a parameter of the operation, the parameter to be frozen according to a portion of parameters to be fixed in each layer of the machine learning model, respective layers of the machine learning model including first parameters and second parameters, the first parameters including the first weights; and
       re-train the machine learning model without modifying the parameter of the operation.

12. The apparatus of claim 11, wherein the respective repeatable hardware blocks include the second hardware core including at least one fixed scalar to store the second weights of the machine learning model, the second parameters including the second weights.

13. The apparatus of claim 12, wherein the at least one processor is to train the second hardware core and the one or more first hardware cores separately.

14. The apparatus of claim 12, wherein the alpha blending layer circuitry includes a trainable alpha blending parameter, and the trainable alpha blending parameter is a function of one of the first parameters, a sigmoid function, and outputs of one or more first hardware cores and a second hardware core in a preceding layer of the machine learning model.

15. The apparatus of claim 12, wherein the respective repeatable hardware blocks include a core shuffle to shuffle feature maps generated by the one or more first hardware cores.

\* \* \* \* \*